US008593392B2

(12) United States Patent
Park et al.

(10) Patent No.: US 8,593,392 B2
(45) Date of Patent: Nov. 26, 2013

(54) BACKLIGHT UNIT AND LIQUID CRYSTAL DISPLAY DEVICE HAVING THE SAME

(75) Inventors: Jung Hoon Park, Gyeongbuk (KR); Dong Im Huo, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 935 days.

(21) Appl. No.: 12/639,374

(22) Filed: Dec. 16, 2009

(65) Prior Publication Data
US 2010/0283716 A1    Nov. 11, 2010

(30) Foreign Application Priority Data

May 8, 2009    (KR) .................. 10-2009-0040232

(51) Int. Cl.
*G09G 3/36*    (2006.01)
(52) U.S. Cl.
USPC ........................................... 345/102
(58) Field of Classification Search
USPC ........................................... 345/102
See application file for complete search history.

(56) References Cited

U.S. PATENT DOCUMENTS

| 4,789,224 A * | 12/1988 | Bougsty .......................... 349/65 |
| 7,325,941 B2 * | 2/2008 | Kim et al. .................... 362/225 |
| 2008/0030641 A1 | 2/2008 | Kim et al. |

FOREIGN PATENT DOCUMENTS

| CN | 101118050 | 2/2008 |
| CN | 201199305 Y | 2/2009 |

OTHER PUBLICATIONS

Chinese Office Action dated Jan. 12, 2012 for corresponding application No. 200910251395.1.

* cited by examiner

*Primary Examiner* — Fred Tzeng
(74) *Attorney, Agent, or Firm* — Morgan, Lewis & Bockius LLP

(57) ABSTRACT

A backlight unit adapted to prevent a combination defect is disclosed.
The backlight unit includes: a plurality of light sources arranged in fixed intervals; first and second light source printed-circuit-boards configured to apply driving signals to the plurality of light sources; a plurality of grips disposed on the first and second light source printed-circuit-boards and engaged with both ends of the light sources; and at least two support sides disposed on both ends of the light sources and configured to each include a protrusion which is united with the support side and is configured to prevent a separation of the light sources.

14 Claims, 3 Drawing Sheets

BACKLIGHT UNIT AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2009-0040232, filed on May 8, 2009, which is hereby incorporated by reference in its entirety.

BACKGROUND

1. Field of the Disclosure

This disclosure relates to a backlight unit, and more particularly to a backlight unit adapted to prevent a combination defect of a light source, and a liquid crystal display device having the same.

2. Description of the Related Art

Liquid crystal display (LCD) devices are widening their application fields because of their features, such as their light weight, slimness, low driving voltage, and so on. This trend is evident in the ways in which the LCD devices have been applied to office automation equipment, audio equipment, video equipment, and so on. The LCD device controls a transmitting amount of light on the basis of image signals applied to a plurality of control switches, in order to display a picture.

The LCD device, which is not self-luminescent, includes a backlight unit irradiating light on the rear surface of an LCD panel in which a picture is displayed. The backlight unit is classified as either an edge type or a direct type in accordance with the disposition of its light source.

The edge type backlight unit includes a light source which is disposed in a position corresponding to a side of the LCD panel. Also, the edge type backlight unit irradiates light emitted from the light source onto the entire surface of the LCD panel using a light guide panel. On the other hand, the direct type backlight unit includes a plurality of light sources arranged opposite the rear surface of the LCD panel. These plural light sources directly apply light to the rear surface of the LCD panel. The direct type backlight unit has a higher brightness and a wider luminescent surface than the edge type backlight unit because it employs plural light sources. In addition, the backlight unit becomes larger in size corresponding to the increased size of the LCD device. In view of these points, direct type backlight units are widely used in LCD devices.

A direct type backlight unit included in an LCD device of the related art includes a plurality of light sources arranged in a fixed interval on the rear surface of a liquid crystal panel, and a diffusion plate and optical sheets disposed over the plurality of light sources. The diffusion plate and the optical sheets diffuse and converge light from the plurality of light sources.

The direct type backlight unit further includes light source drivers disposed at both sides of the light sources. The light source drivers support both ends of the light sources and apply driving signals to the plurality of light sources. To this end, the light source drivers each include a light source PCB (printed circuit board) and grips fixing the respective ends of the light sources.

However, the related art LCD device causes the fastened light sources to be easily separated from the grips while it is combined. Actually, the light sources inserted into the grips can be separated from the grips during the process of feeding or combining the LCD device. Also, the light sources can be left unfastened to the grips by a careless mistake of a worker because the combination of securing the light source with the grip must be performed by the worker. Such a combination defect decreases the productive ratio of the LCD device.

BRIEF SUMMARY

Accordingly, the present embodiments are directed to an LCD device that substantially obviates one or more of problems due to the limitations and disadvantages of the related art.

An object of the present embodiment is to provide a backlight unit adapted to prevent a combination defect, and an LCD device with the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a plurality of light sources arranged in fixed intervals; first and second light source printed-circuit-boards configured to apply driving signals to the plurality of light sources; a plurality of grips disposed on the first and second light source printed-circuit-boards and engaged with both ends of the light sources; and at least two support sides disposed on both ends of the light sources and configured to each include a protrusion which is united with the support side and is configured to prevent a separation of the light sources.

An LCD device according to another aspect of the present embodiment includes: a liquid crystal display panel; a plurality of light sources arranged in fixed intervals under the liquid crystal display panel; first and second light source printed-circuit-boards configured to apply driving signals to the plurality of light sources; a plurality of grips mounted on the first and second light source printed-circuit-boards and engaged with both ends of the light sources; and at least two support sides disposed on both ends of the light sources and configured to each include a protrusion which is united with the support side and is configured to prevent a separation of the light sources.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
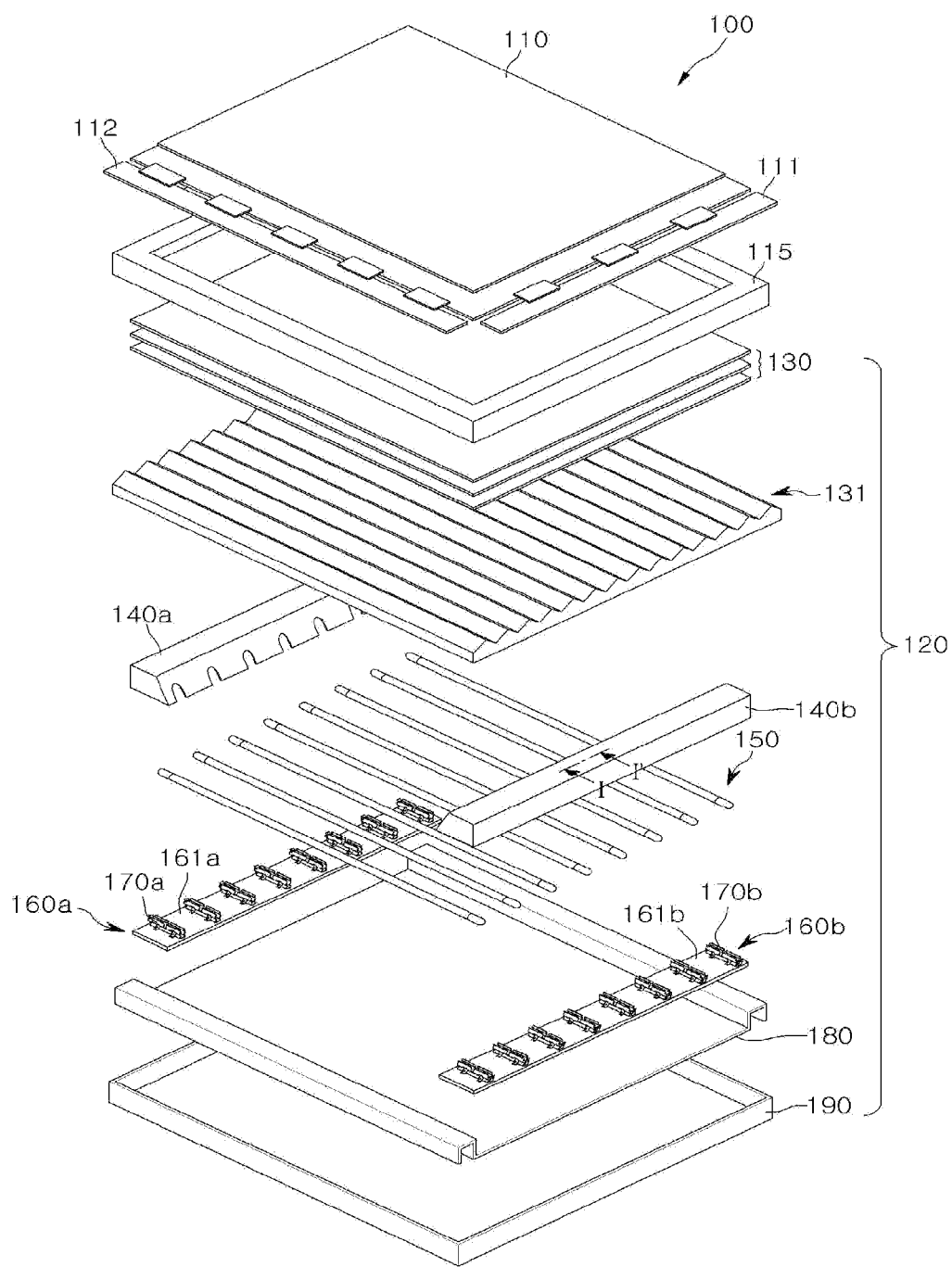
FIG. 1 is an exploded perspective view showing an LCD device with a direct type backlight unit according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is an exploded perspective view showing an LCD device with a backlight unit according to an embodiment of the present disclosure. Referring to FIG. 1, an LCD device according to an embodiment of the present disclosure includes an LCD panel 110 configured to display an image, a panel guide 115 configured to support edges of the rear surface of the LCD panel 110, and a backlight unit 120 combined with the panel guide 115 and configured to irradiate light on the LCD panel 110.

Although it is not shown in detail in the drawings, the LCD panel 110 includes a thin film transistor substrate and a color filter substrate disposed opposite each other and combined to maintain a cell gap between them, as well as a liquid crystal layer interposed between the substrates. On the thin film transistor substrate, a plurality of gate lines are formed, a plurality of data lines are formed to cross the plurality of gate lines, and a plurality of transistors TFT are formed at intersections of the plurality of gate lines and the plurality of data lines. The color filter substrate includes a plurality of color filters and a black matrix. Each of the color filters is formed on the respective pixel. The black matrix is formed on the edges of the color filters opposite to the gate lines, the data lines, and the thin film transistors.

The LCD device further includes a gate driving PCB (printed circuit board) 111 and a data driving PCB 112 disposed on the edges of the LCD panel 110. The gate driving PCB 111 sequentially applies a scan signal to the gate lines on the LCD panel 110. The data driving PCB 112 applies data signals to the data lines on the LCD panel 110. The gate and data driving PCBs 111 and 112 are electrically connected to the LCD panel 110 by means of COFs (chip on film). The COFs can be replaced with tape carrier packages (TCPs).

A backlight unit according to an embodiment of the present disclosure will now be explained as a direct type which can be applied to a large-sized LCD device of at least 20 inches.

The backlight unit 120 includes a bottom cover 180 with an opened upper surface, a plurality of light sources 150 arranged at fixed intervals on the bottom cover 190, a diffusion plate 131 disposed over the plural light sources 150, optical sheets 130 disposed on the diffusion plate 131, and a reflection sheet 180 disposed under the plural light sources 150. The diffusion plate 131 first diffuses light. The optical sheets 130 force the first diffused light to be secondarily diffused and converged. The reflection sheet 180 reflects light progressing downward from the light sources 150 toward the LCD panel 110.

The backlight unit 120 further includes first and second light source driver portions 160a and 160b disposed at both ends of the plural light sources 150. The first and second light source portions 160a and 160b apply a drive signal to the plural lamps 150. To this end, the first light source portion 160a includes a first drive PCB 161a, as well as first grips 170a arranged on the first drive PCB 161a and engaged with one ends of the plurality of light sources 150. Similarly, the second light source portion 160b includes a second drive PCB 161b, and second grips 170b arranged on the second drive PCB 161b and engaged with the other ends of the plurality of light sources 150.

Also, the backlight unit 120 includes first and second support sides 140a and 140b disposed at both ends of the plurality of light sources 150. The first and second support sides 140a and 140b guide light emitted from the light sources 150 to the edges of the LCD panel 110 and support the diffusion plate 131. The light sources 150 include EEFLs (external electrode fluorescent lamps) which each have electrodes exposed at their ends. Alternatively, the light sources 150 can include CCFLs (cold cathode fluorescent lamps).

Figure 2:
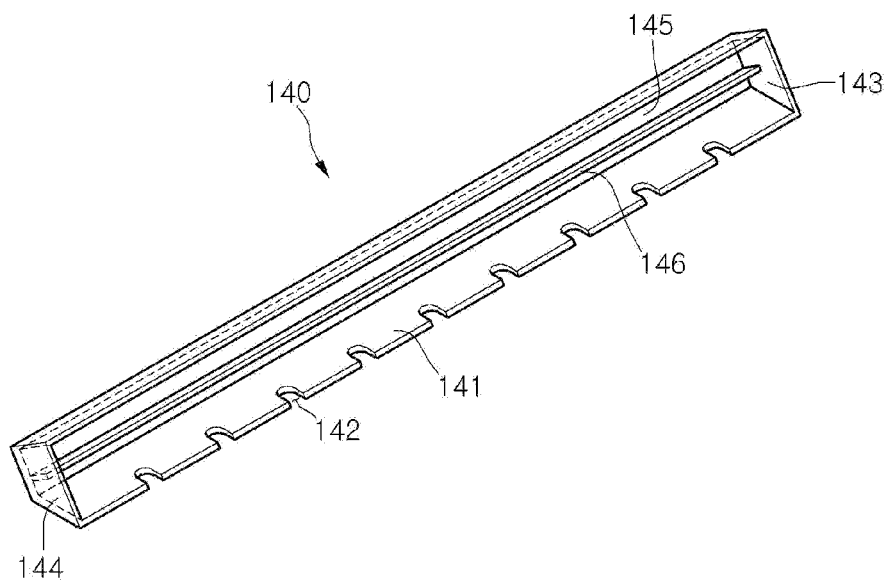
FIG. 2 is a perspective view showing a side supporter of FIG. 1.
Figure 3:
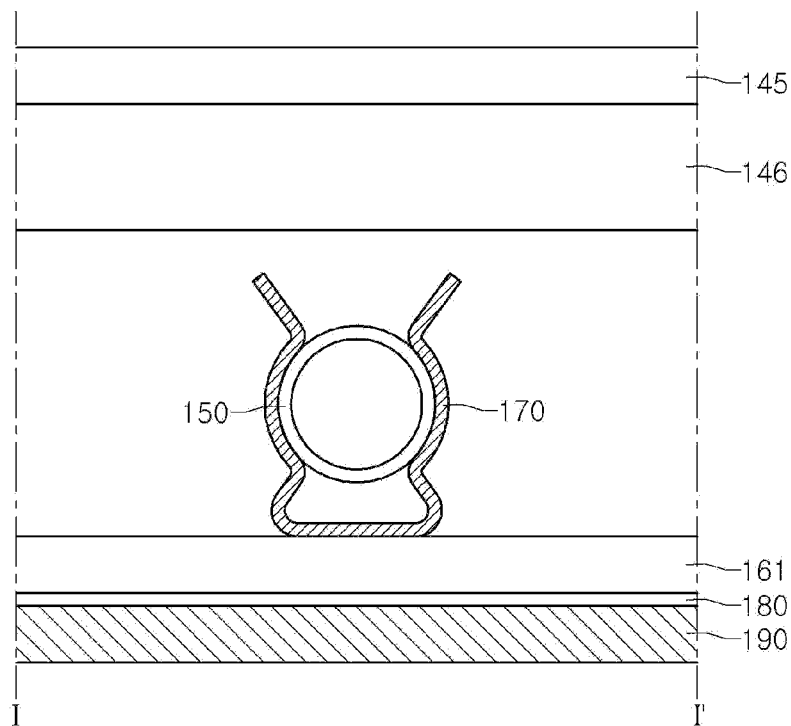
FIG. 3 is a cross-sectional view showing a backlight unit taken along the line I-I' of FIG. 1.

FIG. 2 is a perspective view showing a side supporter of FIG. 1, and FIG. 3 is a cross-sectional view showing a backlight unit taken along the line I-I' of FIG. 1. As shown in FIGS. 2 and 3, a support side 140 according to an embodiment of the present disclosure is disposed at one end of the light sources 150 and has an opened lower surface.

The support side 140 includes a first side wall 141 in which a plurality of recesses 142 are formed, second and third side walls 143 and 144 which are positioned at both ends of the first side wall 141, and a top plate 145 on which the diffusion plate 131 and the optical sheets 130 are disposed. The plurality of recesses 142 allows one ends of the light sources 150 to pass through the first side wall 141. The second and third side walls 143 and 144 are disposed opposite each other.

The support side 140 further includes a protrusion 146 for preventing a separation of the light sources 150. The separation-preventing protrusion 146 extends inwardly from the rear surface of the top plate 145 and prevents the light sources 150 from being separated from the respective grips 170. To this end, the separation-preventing protrusion 146 is positioned at a region of the rear surface of the top plate 145, opposite to the grips 170.

The grip 170 receiving the light source 150 is mounted on a drive PCB 161. The drive PCB 161 is disposed on a reflection sheet 180. The reflection sheet 180 is disposed on a bottom cover 190.

The separation-preventing protrusion 146 extended inwardly from the rear surface of the top plate 145 continuously stretches from the inner surface of the second side wall 143 to the inner surface of the third side wall 144. In other words, the separation-preventing protrusion is formed in a bar shape which is continued from the inner surface of the second side wall 143 to the inner surface of the third side wall 144 along with the longitude direction of the support side 140. In order to surely prevent the separation of the light sources 150 using the separation-preventing protrusion 146, a distance between a lower end of the separation-preventing protrusion 146 and an upper end of the grip 170 must be shorter than the diameter of the light source 150.

The first to third side walls 141, 143, and 144, the top plate 145, and the separation-preventing protrusion 146 can be formed in a united shape (i.e., a single body) when the support side 140 is manufactured.

With the exception of the separation-preventing protrusion 146, the support side 140 can further include screw protrusions (not shown) being engaged with screws, fixing protrusions (not shown) for fixing the drive PCB 161, and others, even though they are not shown in the drawings.

In this manner, the backlight unit according to an embodiment of the present disclosure can prevent the separation of the light sources 150 from the grips 170 using the separation-preventing protrusion 146 which is formed in a united shape (i.e., a single body) on the support side 140. Therefore, the combination defects of the backlight unit can be prevented or minimized.

Figure 4:
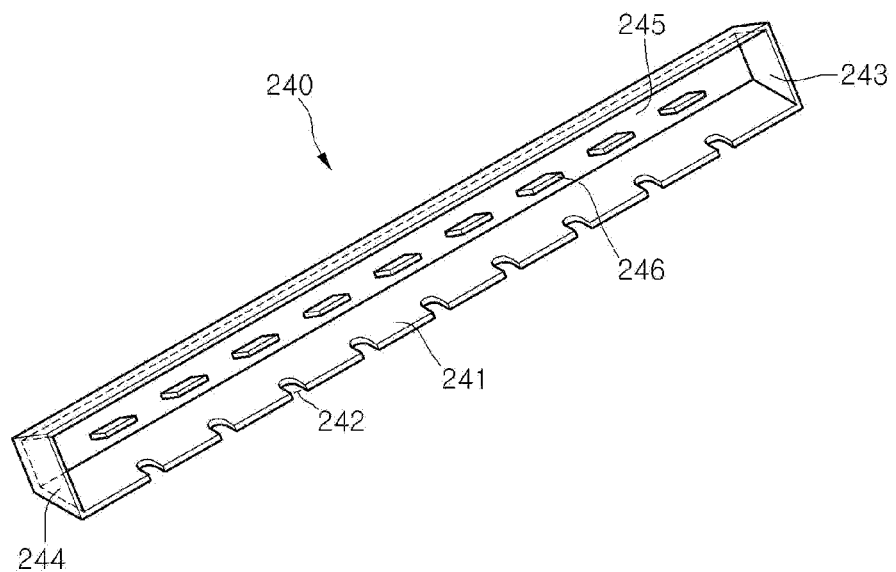
FIG. 4 is a perspective view showing a side supporter according to another embodiment of the present disclosure.
Figure 5:
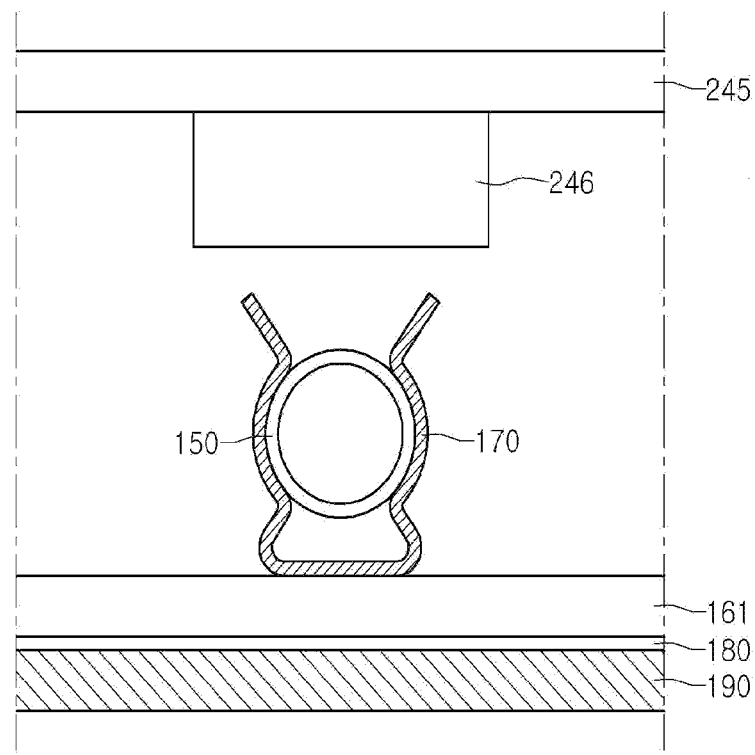
FIG. 5 is a cross-sectional view showing a backlight unit according to another embodiment of the present disclosure.

FIG. 4 is a perspective view showing a side supporter according to another embodiment of the present disclosure, and FIG. 5 is a cross-sectional view showing a backlight unit according to another embodiment of the present disclosure. As shown in FIGS. 4 and 5, a support side 240 according to another embodiment of the present disclosure is disposed at one end of the light sources 150 and has an opened lower surface.

The support side 240 includes a first side wall 241 in which a plurality of recesses 242 are formed, second and third side walls 243 and 244 which are positioned at both ends of the first side wall 241, and a top plate 245 on which the diffusion plate 131 and the optical sheets 130 are disposed. The plurality of recesses 242 allows one ends of the light sources 150 to pass through the first side wall 241. The second and third side walls 243 and 244 are disposed to face each other.

The support side 240 further includes a plurality of protrusions 246 for preventing a separation of the light sources 150. The plurality of separation-preventing protrusions 246 extend inwardly from the rear surface of the top plate 245 and prevent the separation of the light sources 150 from the respective grips 170. To this end, the separation-preventing protrusions 246 are positioned at a region of the rear surface of the top plate 245 opposite to the grips 170.

The grip 170 receiving the light source 150 is mounted on a drive PCB 161. The drive PCB 161 is disposed on a reflection sheet 180. The reflection sheet 180 is disposed on a bottom cover 190.

The separation-preventing protrusions 246 extend downwardly (or inwardly) from the rear surface (or inner surface) of the top plate 245 and are separated from one another. In other words, the separation-preventing protrusions 246 stretch inwardly from the rear surface of the top plate 245 are arranged in fixed intervals along with the longitude direction of the support side 240. In order to surely prevent the separation of the light sources 150 using the separation-preventing protrusions 246, a distance (or an interval) between the lower ends of the separation-preventing protrusions 246 and the upper ends of the grips 170 must be shorter than the diameter of the light source 150.

The first to third side walls 241, 243, and 244, the top plate 245, and the separation preventing protrusions 246 can be formed in a united shape (i.e., a single body) when the support side 240 is manufactured.

With the exception of the separation preventing protrusions 246, the support side 240 can further include screw protrusions (not shown) being engaged with screws, fixing protrusions (not shown) for fixing the drive PCB 171, and others, even though they are not shown in the drawings.

As described above, the backlight unit according to another embodiment of the present disclosure can prevent the separation of the light sources 150 from the grips 170 using the separation-preventing protrusions 246 which are formed in a united shape (i.e., a single body) on the support side 240. Therefore, the combination defects of the backlight unit can be prevented or minimized. Furthermore, a productive ratio of the LCD device can be improved.

Although the present disclosure has been explained regarding only the two embodiments described above, it is not limited to these. To rectify this, the support sides 140 and 240 preventing the separation of the light sources 150 from the grips 170 may be embodied in a variety of structures. Also, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit comprising:
   a plurality of light sources arranged in fixed intervals;
   a first light source printed-circuit-board and a second light source printed-circuit-board configured to apply driving signals to the plurality of light sources;
   wherein one end portion of each individual light source of the plurality of light sources is located on the first light source printed-circuit-board;
   wherein the other end portion of each individual light source of the plurality of light sources is located on the second light source printed-circuit-board;
   a plurality of grips disposed on the first light source printed-circuit-board and the second light source printed-circuit-board and engaged with both ends of each individual light source of the plurality of light sources; and
   at least two support sides disposed on both ends of the light sources and configured to each include a protrusion which is united with the support side and is configured to prevent a separation of the light sources.

2. The backlight unit claimed as claim 1, wherein the separation-preventing protrusion is positioned at a region of the support side opposite to the grips.

3. The backlight unit claimed as claim 1, wherein the support side includes:
   a first side wall in which a plurality of recesses are formed to be passed by the ends of the light sources;
   second and third side walls which are opposite to each other in a longitude direction of the support side, and
   a top plate configured to support a diffusion plate and optical sheets disposed on the light sources.

4. The backlight unit claimed as claim 3, wherein the separation-preventing protrusion extends inwardly from the top plate.

5. The backlight unit claimed as claim 3, wherein the separation-preventing protrusion extends from an inner surface of the second side wall to an inner surface of the third side wall.

6. The backlight unit claimed as claim 3, wherein the separation preventing protrusion is configured to include a plurality of members arranged in fixed intervals on the top plate and confronted with the grips.

7. The backlight unit claimed as claim 1, wherein the separation-preventing protrusion is formed in a bar shape which continuously progresses along a longitude direction of the support side.

8. A liquid crystal display device comprising:
   a liquid crystal display panel;

a plurality of light sources arranged in fixed intervals under the liquid crystal display panel;

a first light source printed-circuit-board and a second light source printed-circuit-board configured to apply driving signals to the plurality of light sources;

wherein one end portion of each individual light source of the plurality of light sources is located on the first light source printed-circuit-board;

wherein the other end portion of each individual light source of the plurality of light sources is located on the second light source printed-circuit-board;

a plurality of grips disposed on the first light source printed-circuit-board and the second light source printed-circuit-board and engaged with both ends of each individual light source of the plurality of light sources; and at least two support sides disposed on both ends of the light sources and configured to each include a protrusion which is united with the support side and is configured to prevent a separation of the light sources.

9. The liquid crystal display device claimed as claim 8, wherein the separation-preventing protrusion is positioned at a region of the support side opposite to the grips.

10. The liquid crystal display device claimed as claim 8, wherein the support side includes:
   a first side wall in which a plurality of recesses are formed to be passed by the ends of the light sources;
   second and third side walls which are opposite to each other in a longitude direction of the support side, and
   a top plate configured to support a diffusion plate and optical sheets disposed on the light sources.

11. The liquid crystal display device claimed as claim 10, wherein the separation-preventing protrusion extends inwardly from the top plate.

12. The liquid crystal display device claimed as claim 10, wherein the separation-preventing protrusion extends from an inner surface of the second side wall to an inner surface of the third side wall.

13. The liquid crystal display device claimed as claim 10, wherein the separation preventing protrusion is configured to include a plurality of members arranged in fixed intervals on the top plate and confronted with the grips.

14. The liquid crystal display device claimed as claim 8, wherein the separation-preventing protrusion is formed in a bar shape which continuously progresses along a longitude direction of the support side.

* * * * *